Patented Jan. 13, 1953

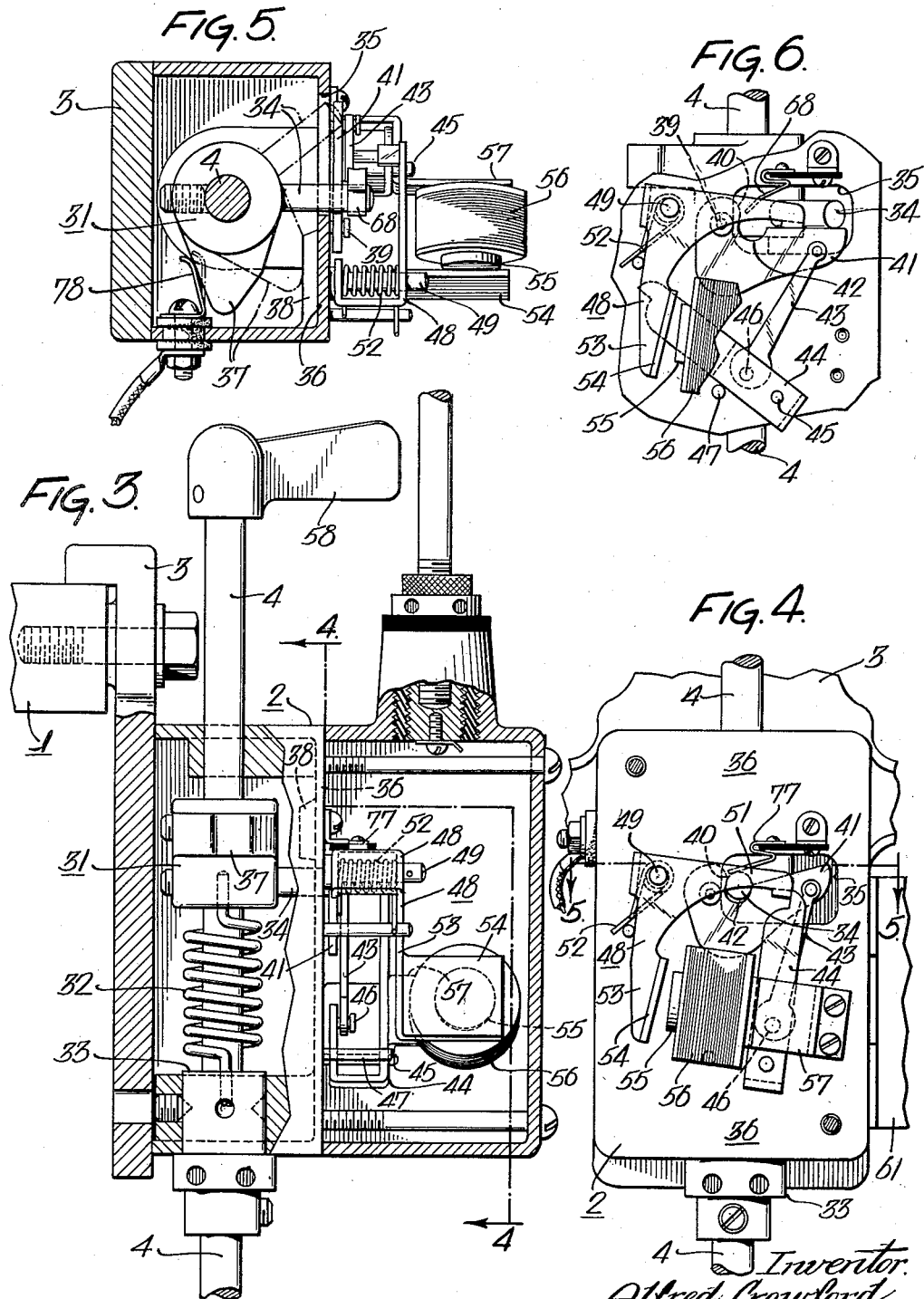

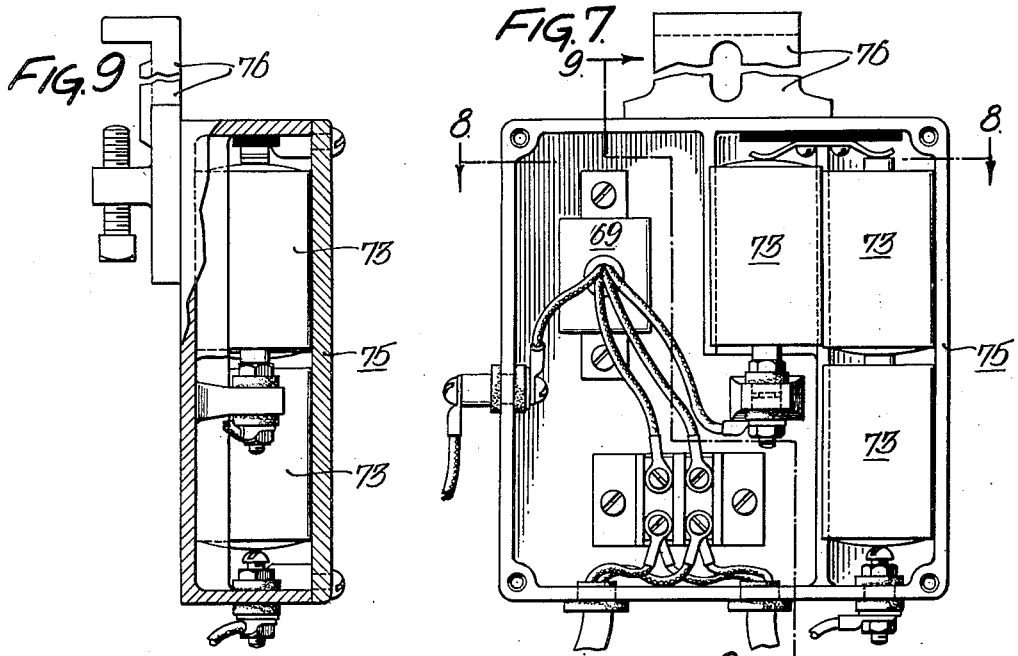
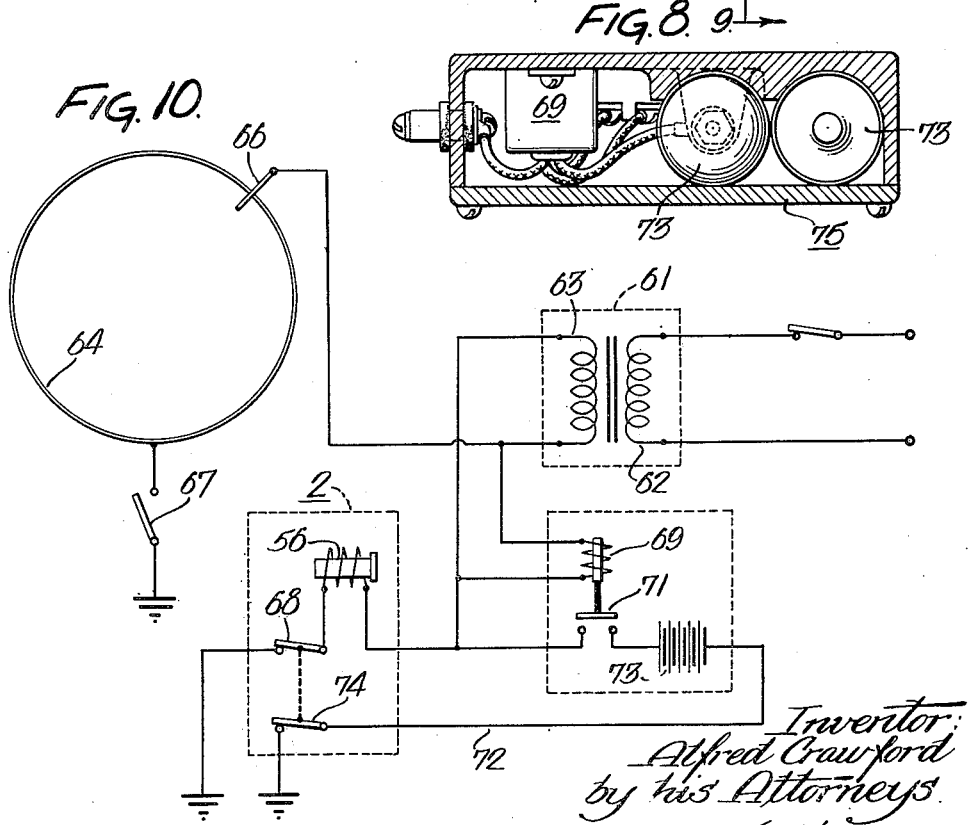

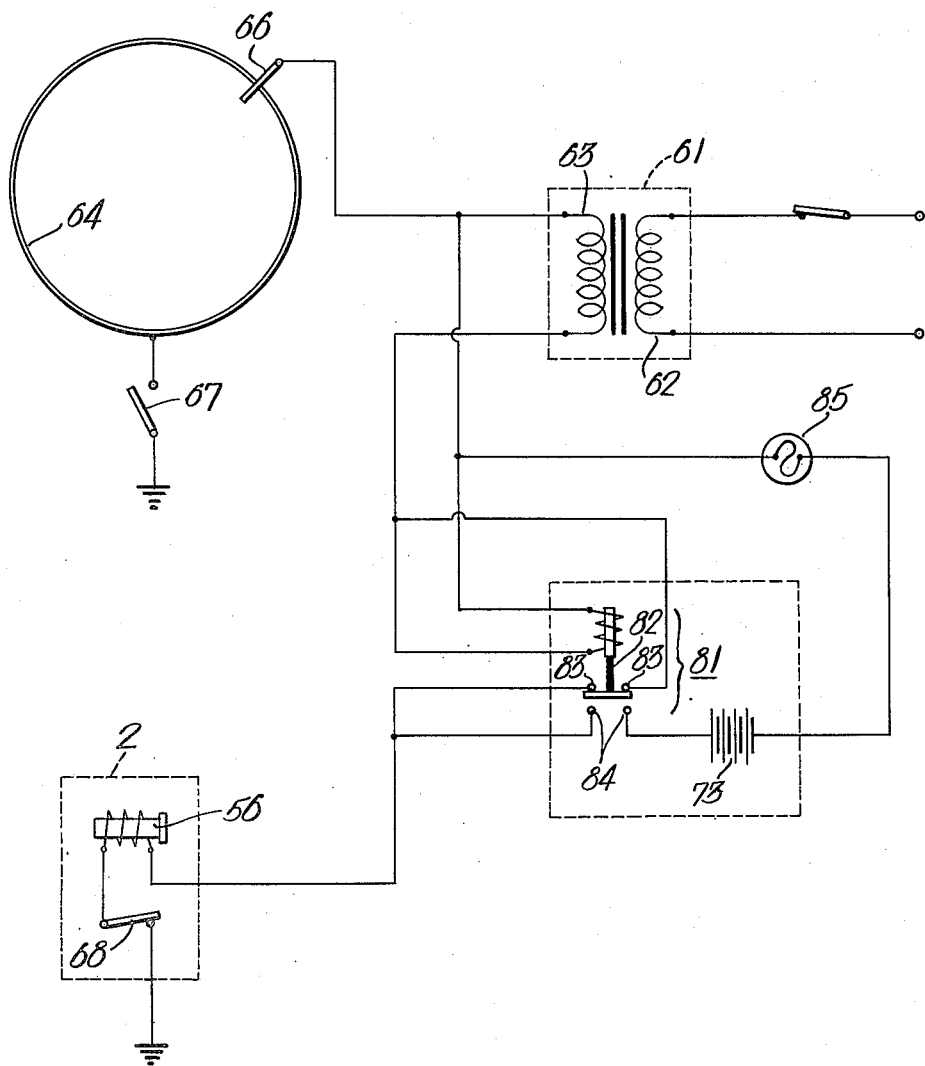

2,625,027

UNITED STATES PATENT OFFICE 2,625,027

AUTOMATIC SUPPLEMENTARY SOURCE FOR ELECTRIC STOP-MOTIONS

Alfred Crawford, New Brunswick, N. J., assignor to The Crawford Manufacturing Company, Incorporated, New Brunswick, N. J., a corporation of New Jersey Application February 28, 1949, Serial No. 78,825

9 Claims. (Cl. 66—163)

This invention relates to stop motions of the general class disclosed in United States Letters Patent No. 2,145,754, and more particularly to improvements in stop motions of the type wherein an electrically controlled knockoff device is associated with a control circuit in such manner that the knockoff device is released by energization of the said control circuit and, when set, will remain in set condition as long as the said circuit is deenergized.

In stop motions of this class the normally open control or detector circuit is conventionally connected to a source of electrical energy, such for example as a lighting circuit, which is independent of the source from which power is applied to the knitting machine and, since the operation of the stop motion is dependent upon the closing of the said circuit, any interruption of the energy supply from the source such as that resulting for example from a blown fuse or from inadvertent disconnection of the detector circuit from the source will have no immediate effect upon the stop motion or upon the operation of the machine. If after such interruption the control circuit is closed by actuation of one of the detector devices associated therewith, the stop motion will fail to function with obvious undesirable results.

A primary object of the present invention is to provide means operative automatically upon failure of the primary source of electrical energy for immediately connecting a supplementary energy source in the detector circuit.

Another object of the invention is to provide means whereby, under the above-outlined emergency circumstances, the stop motion will still function instantaneously and automatically to stop the knitting machine.

To this latter end the invention contemplates the provision in the electrical control system of a separate source of energy together with means normally energized from the primary source to maintain the secondary source disconnected from the knockoff device, said means being operative upon failure of the primary source to connect the secondary source with the knockoff device in a manner to actuate the latter and to thereby interrupt the operation of the machine.

The invention will be more readily understood by reference to the attached drawings, wherein:

Fig. 3 is an enlarged vertical sectional view of the knockoff device;

Fig. 4 is a sectional view on the line 4—4, Fig. 3;

Fig. 5 is a sectional view on the line 5—5, Fig. 4;

Fig. 6 is a fragmentary elevational view showing details of the latch device;

Fig. 7 is a front view of the secondary power source unit forming an element of the invention;

Fig. 8 is a sectional view on line 8—8, Fig. 7;

Fig. 9 is a sectional view on line 9—9, Fig. 7;

Fig. 10 is a diagrammatic view showing the electrical system, and

Fig. 11 is a wiring diagram illustrating a modification within the scope of the invention.

Figure 1:
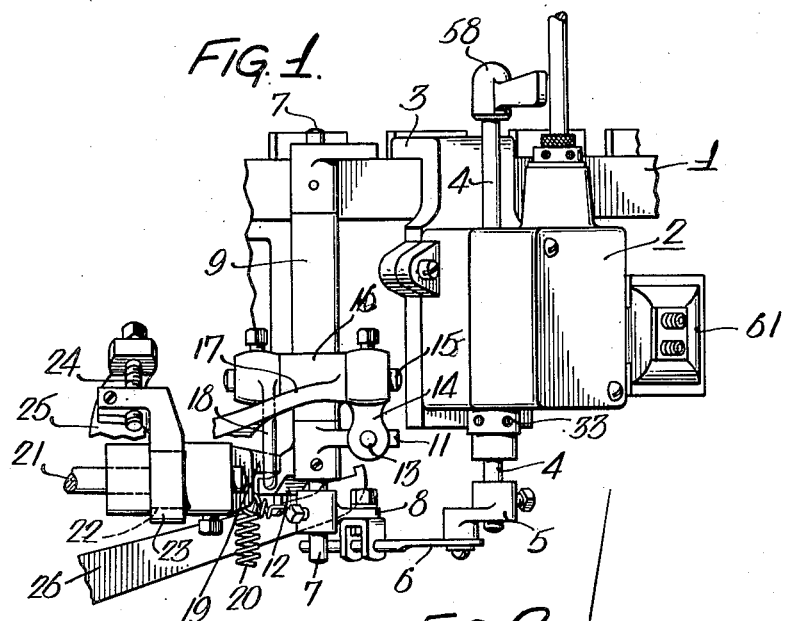
Fig. 1 is a fragmentary elevational view of a knockoff device made in accordance with the invention, and of the immediately associated parts of the knitting machine.
Figure 2:
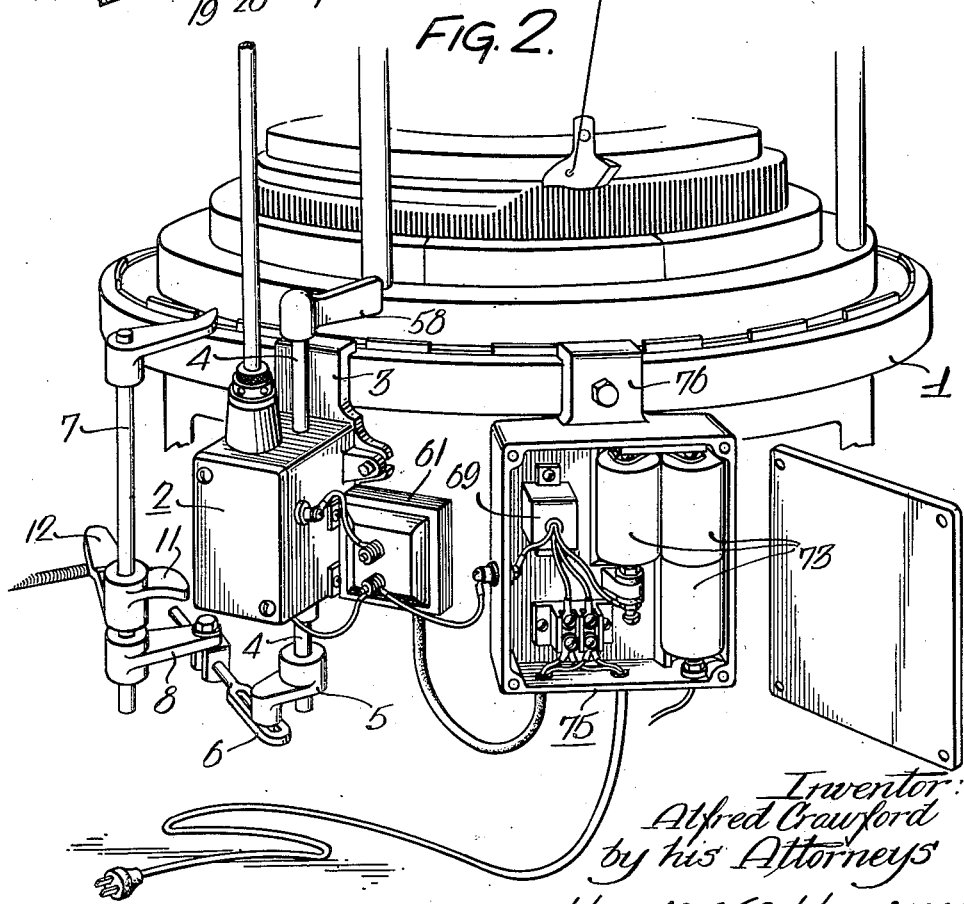
Fig. 2 is a diagrammatic view in perspective showing a portion of the knitting machine and the elements of the knockoff device.

The invention will be more readily understood by reference first to Figs. 1 and 2 of the drawings. Therein the reference numeral 1 indicates a fragmentary part of the main bedplate of a knitting machine of conventional type, such for example as that disclosed in the aforesaid United States Patent No. 2,145,754. The reference numeral 2 indicates a casing within which are housed elements of the knockoff device illustrated in detail in subsequent figures of the drawings, said casing being supported on a bracket 3 attached to the said main frame. 4 is a trip shaft which extends through the casing 2 and which is connected through a lever 5 attached to its lower end and through a link 6 with a knockoff shaft 7, the latter shaft having attached thereto a lever 8, and the said link 6 being pivotally connected to that lever and to the lever 5 on the shaft 4.

The knockoff shaft 7 which is journaled in a bearing 9 on the main frame 1 carries two arms or levers 11 and 12 respectively. The lever 11 engages one end of a screw 13 in a lever 14 attached to one end of a rock shaft 15 which is supported in a journal 16 on a bracket 17, and the other end of the lever carries a catch 18 arranged to engage, and to normally support against the pull of a spring 20, a brake lever 19 on a brake shaft 21. This shaft carries an eccentric 22 which is embraced by a strap 23 and the strap carries a reach rod in the form of a screw 24 which engages one arm of a brake element 25 operatively associated with the main shaft (not shown) of the machine.

The knockoff lever 12 is arranged for operative engagement with a clutch shift-rod-retaining lever 26 which is pivotally mounted on the main frame of the machine and which normally interlocks with the spring-actuated shifting rod of a clutch associated with a drive pulley loose on the aforementioned main shaft of the knitting machine and controlling the connection of the pulley with the shaft. In the drawings the shift rod and clutch are not shown.

The functions of the brake and clutch will be understood by those familiar with the art and the general mode of operation of the portion of the knockoff mechanism described above is clearly set forth in United States Patent No. 2,145,754 aforesaid. Normally the trip shaft 4 is maintained by devices hereinafter described in a position wherein the brake is retracted and the clutch is engaged to connect the drive pulley with the shaft. When the knockoff is tripped and the shaft 4 thereby released the clutch is disengaged and the brake applied to bring the knitting machine to an immediate halt.

Referring more particularly to Figs. 3 to 6 of the drawings, it will be noted that the shaft 4 has a collar 31 attached to that portion thereof which occupies the interior of the casing 2, and a spring 32 embraces the shaft and has one end thereof anchored in the collar 31 and the other end anchored in a sleeve or bushing 33 secured in the wall of the casing. Projecting transversely from the collar 31 is a pin 34 which projects through an aperture 35 in a wall 36 of the casing.

Normally the spring 32 will hold the shaft 4 in a position wherein the collar 31 and the pin 34 occupy the positions shown in broken lines in Fig. 5, it being noted that the said collar is extended radially at one side to form a shoe 37 which, in the said normal position of the shaft 4, bears against a stop 38 on the said wall 36. Pivotally attached at 39 to the wall 36 is a lever 41 having a semi-circular recess 42 which, under conditions hereinafter described, is adapted to receive the pin 34 so that the lever may act as a latch to retain the pin and therefore the shaft 4 in the position shown in full lines in Fig. 5 against the tendency of the spring 32 to shift the shaft and pin to the dotted line positions as previously described. Pivotally attached to the outer end of the lever 41 is one link 43 of a toggle, the other link of which is indicated by the reference numeral 44. This latter link, which is U-shaped in form as best shown in Fig. 3, is pivotally supported upon a pin 45 which projects from the wall 36 and is pivotally connected at 46 to the link 43. When the lever 41 is in the retracted position as shown in Fig. 6, the link 44 will seat against a stop pin 47 on the wall 36. In this position the toggle 43—44 is broken. When the shaft 4 is rocked to carry the pin 34 from the position of Fig. 6 to the position shown in full lines in Fig. 5, in which position the pin will overlie the recess 42 of the lever 41, this lever will be elevated by engagement of the pin with the upper edge portion 40 thereof, thereby extending the toggle 43—44 to the position indicated in Fig. 4 and bringing the pin 34 into the recess 42. The lever 41, as long as it is supported in the elevated position, will act to retain the pin and the shaft 4 in the retracted position against the pressure of the spring 32.

The toggle 43—44 is adapted to be retained in the extended position by a bell crank lever 48 which is pivotally supported on a pin 49 projecting from the wall 36. One arm 51 of the lever 48 extends transversely into engagement with the upper extremity of the link 44, as best shown in Fig. 4, and when thus engaged with the said link tends to hold the toggle 43—44 in the extended position against the pressure of the spring 32 which, acting through the shaft 4 and pin 34, tends to force the lever 41 downwardly, such movement of the lever 41 being possible only when the said toggle is broken. As shown in Fig. 4 the thrust of the link 44 upon the arm 51 of the bell crank lever 48 is in the direction of the pivot 49 and a coiled spring 52 carried by the pivot pin 49 exerts pressure upon the lever 48 to hold this lever in the operative position with respect to the link 44, as shown in Fig. 4. The other arm 53 of the lever 48 has a flange 54 which is arranged in operative relation to the armature 55 of an electromagnet 56 supported on a bracket 57 on the wall 36. Normally, and as hereinafter more fully set forth, the magnet 56 is deenergized, but when energized this magnet will exert sufficient force to draw the flange 54 toward the armature 55 against the resisting pressure of the spring 52 so that the arm 51 of the lever 48 will be elevated clear of the extremity of the link 45, thereby releasing the toggle 43—44 and permitting the lever 41 to move downwardly and to release the pin 34. Upon release of the toggle as described above, and subsequent deenergization of the magnet 56 the parts will assume the relative positions as shown in Fig. 6. The device may be reset to the latched position by means of a reset lever 58 at the upper end of the shaft 4.

With reference now to the diagram of Fig. 10, it will be noted that the electromagnet 56 of the knockoff device described above is connected in a control circuit which receives its energy through a transformer 61, the primary coil 62 of which is connected with a suitable source of electrical energy such for example as an available lighting circuit. The secondary coil 63 of the transformer is in series with the electromagnet 56 in a circuit which includes a collector ring 64, a brush 66 and one or more normally open detector switches of which one is indicated at 67. In operation the collector ring 64 rotates with the cam ring of the knitting machine and the brush 66 continuously contacts the ring 64. The circuit also includes a switch 68, one terminal of which is grounded as also is one terminal of the detector switch 67. The detector switch 67 is normally open and thus the aforedescribed grounded circuit is normally broken.

In accordance with the present invention the electrical control system also includes a shunt circuit which contains the coil 69 of a magnetic switch 71 which is associated with a grounded circuit designated generally by the reference numeral 72. The coil 69 of the switch 71 is normally energized and when energized retains the switch 71 in open position as shown in Fig. 10, thereby breaking the circuit 72. This circuit 72 also contains a suitable source of electrical energy 73, in the form for example of dry cells, and also a switch 74, one terminal of which is grounded. In the present instance the switch 74 is mechanically connected with the switch 68 so that these two switches open and close simultaneously.

With the arrangement described above, any failure of the connection between the primary of the transformer 61 and the source of energy with which it is connected will result in a deenergization of the coil 69 and consequent closing of the switch 71 and circuit 72. The source of energy 73 will then energize the electromagnet 56 and will thereby trip the knockoff device described above. Simultaneously and as hereinafter described the switches 68 and 74 will be opened.

Under normal conditions energy will be supplied through the transformer secondary 63 to the control circuit so that if the detector switch 67 is closed the electromagnet 56 will be energized in obvious manner to thereby actuate the knockoff device. The circuit 72 with the supplementary source of energy 73 will function as described above to trip the knockoff device in the event of failure of the transformer circuit, and will thereby avoid possible damage to the machine which might result in event of inadvertent failure of the transformer circuit and subsequent faulty operation of the knitting machine which, while closing the detector switch 67, would then fail to interrupt the operation of the machine.

With reference to Figs. 1 and 2 it will be noted that the transformer 61 is secured in the present instance to the side of the casing 2 of the knockoff device, and the electrically actuated switch 71 and the supplementary source of electrical energy 73 are contained in the present instance in a casing 75 which is mounted in the present instance on a bracket 76 attached to the main frame 1 of the knitting machine.

With reference to Figs. 4, 5 and 6, it will be noted that the switch 68 of the circuit described above comprises a contact element 77 which engages the pin 34 only when that pin occupies the recess 42 of the lever 41 and which, when the pin 34 is released from this recess, is free from contact with any grounded portion of the machine. The switch 74 (see Fig. 5) consists of a contact element 78 which engages the shoe 37 also only when the pin 34 occupies the recess 42 and which is left free from contact with any grounded portion of the machine when the pin 34 has been released and the shaft 4 rotated under pressure of the spring 32. It will be apparent therefore that when the knockoff device is tripped the switches 68 and 74 will be automatically opened thereby to break the circuit of the supplementary source of energy 73.

In the operation of the device described above the control circuit will operate normally as long as the transformer 61 is connected to the primary source of energy. If for any reason the primary coil 62 of the transformer is deenergized the supplementary source of energy 73 will be immediately thrown into the circuit containing the electromagnet 56 and will trip the knockoff device independently of the detector switch 67 to thereby bring the machine to a halt.

In the modified device shown in Fig. 11, I have provided for automatic substitution of the supplementary energy source in the detector circuit upon failure of the primary source, but in this instance without accompanying actuation of the knockoff device. In Fig. 11 the essential elements of the apparatus have been identified by the same reference numerals used in Fig. 10. In this case, however, the electrically controlled switch 69—71 of the embodiment shown in Fig. 10 has been replaced by a double-pole double-throw relay designated generally by the reference numeral 81. When this relay is energized, which occurs during the periods when the transformer 61 is energized from the primary source, the switch arm 82 of the relay 81 is elevated into engagement with the contacts 83, 83 whereby the detector circuit is conditioned for operation upon closing of the switch 67. When the primary source of energy fails with the resultant deenergization of the transformer 61 the switch arm 82 of the relay is permitted to drop into engagement with the contact elements 84, 84 thereby connecting the supplementary energy source 73 in the detector circuit and maintaining that circuit in condition for actuation of the electromagnet 56 of the knockoff device when the switch 67 is closed.

In this case, therefor, the substitution of the supplementary source 73 for the primary source of energy does not have the effect of automatically actuating the knockoff device of the stop motion so that the machine will remain in operation until actuation of the detector switch 67 closes the knockoff device.

In order that the operator may be aware of the fact that the primary source has failed and that the supplementary source has been automatically connected in the detector circuit a visible or audible signal may be associated with the supplementary source in such manner that when this source is connected in the circuit the signal will be actuated. In the present instance the signal device is shown in the form of a lamp 85 placed in series with the supplementary source 73. It will be apparent that when the operator has reestablished the connection of the detector circuit with the primary energy source that the relay 81 will operate automatically to restore the circuit by way of the contacts 83, 83 and will break the connection of the circuit with the supplementary source 73.

I claim:

1. An electric stop motion comprising in combination a knockoff device, an electric actuator for said device, a primary source of electrical energy for connection with said actuator, a normally open detector switch for controlling the connection of said actuator with said source, a secondary source of electrical energy normally disconnected from the actuator, and means for automatically connecting the secondary source with the actuator independently of the said detector switch upon failure of the primary source.

2. A stop motion according to claim 1 including a switch controlling the connection of the secondary source to the actuator, said switch having electrical actuating means connected to the primary source.

3. A stop motion according to claim 2 wherein the said switch which controls the connection of the secondary source to the actuator is normally maintained in the open position by the said electrical actuating means connected to the primary source and closes automatically when the supply of energy from the primary source fails.

4. A stop motion according to claim 1 wherein means is provided for automatically disconnecting the secondary source from the actuator subsequent to the connection of the actuator with the secondary source.

5. In an electric stop motion, a knockoff device, an electric actuator for said device, a normally open detector switch, a primary source of electric energy, an electrical system including said actuator, switch, and primary source, and providing for energization of the actuator from said source when the switch is closed, said system including also an independent secondary source of electric energy and a normally open switch for segregating said secondary source from the said actuator, and means responsive to failure of the primary source for closing the last named switch so as to provide for delivery of energy to the actuator from the secondary source.

6. An electric stop motion according to claim 5 wherein the said electrical system includes parallel portions containing the said sources respectively.

7. An electric stop motion according to claim 6 wherein the detector switch is in series with the said parallel portions in the system.

8. An electric stop motion according to claim 7 wherein an electric signal element is included in the parallel portion which contains the said secondary source.

9. In an electric stop motion, a knockoff device, an electric actuator for said device, a normally open detector switch, a primary source of electric energy, an electrical system including said actuator, switch, and primary source, and providing for energization of the actuator from said source when the switch is closed, said system including also an independent secondary source of electric energy and a normally open switch for segregating said secondary source from the said actuator, means responsive to failure of the primary source for closing the last named switch so as to provide for delivery of energy to the actuator from the secondary source, said electrical system having parallel portions respectively containing the said sources of electric energy and the said detector switch being positioned in that parallel portion of the said system which contains the said primary source of energy.

ALFRED CRAWFORD.

REFERENCES CITED

The following references are of record in the file of this patent:

UNITED STATES PATENTS

| Number | Name | Date |
|---|---|---|
| Re. 19,848 | Beetem | Feb. 11, 1936 |
| 958,758 | Denneen | Feb. 8, 1910 |
| 1,169,537 | Gugler et al. | Jan. 25, 1916 |
| 2,488,614 | Antonovich | Nov. 22, 1949 |